R. E. JOYCE.
METER TESTER.
APPLICATION FILED AUG. 1, 1911.
1,023,739.
Patented Apr. 16, 1912.
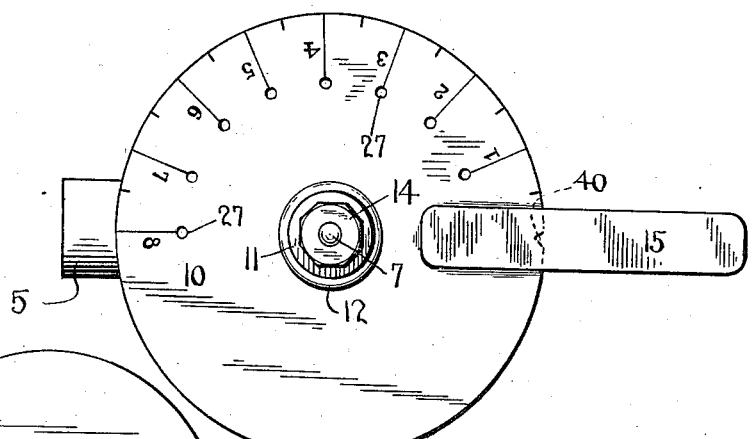
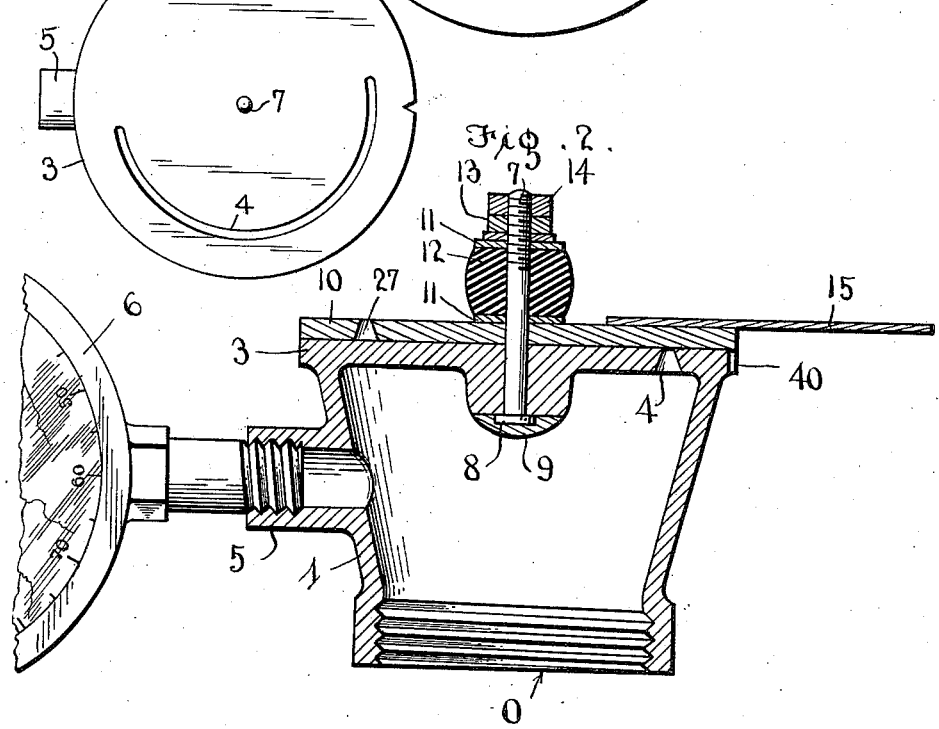
Witnesses:
L. B. James
N. L. Collamer
Inventor:
R. E. Joyce,
by H. B. Willson & Co.,
Attorneys.

UNITED STATES PATENT OFFICE.

ROY E. JOYCE, OF COFFEYVILLE, KANSAS, ASSIGNOR OF ONE-HALF TO W. H. SHEPARD, OF COFFEYVILLE, KANSAS.

METER-TESTER.

1,023,739. Specification of Letters Patent. Patented Apr. 16, 1912.

Application filed August 1, 1911. Serial No. 641,851.

*To all whom it may concern:*

Be it known that I, ROY E. JOYCE, a citizen of the United States, residing at Coffeyville, in the county of Montgomery and State of Kansas, have invented certain new and useful Improvements in Meter-Testers; and I do declare the following to be a full, clear, and exact description of the invention, such as will enable others skilled in the art to which it appertains to make and use the same.

This invention relates to measuring instruments, and more especially to testing devices; and the object of the same is to produce an improved portable device for testing domestic meters without necessarily disconnecting the same from the service pipe. This object is accomplished by the construction of a device hereinafter more fully described and claimed and as shown in the drawings wherein—

Figure 1 is a plan view with the nipple for the gage closed by a plug; Fig. 2 is a central vertical sectional view showing a gage attached to the nipple; Fig. 3 is a plan view of the device with the disk removed.

In the drawings the numeral 1 designates a substantially cylindrical metallic casing having through its bottom a threaded opening O of standard size so that it may be attached to any domestic meter now in common use, its top 3 is pierced by an elongated curved outlet opening 4, and one side is provided with a nipple 5 to which may be fixedly or removably attached a gage 6 for measuring the pressure. Through the center of the top 3 projects a post 7 which is shown herein as a bolt or screw whose head 8 stands beneath the top and is sealed tight by solder 9.

Centrally journaled upon the post 7 is a disk 10, and the lower face of the disk and the upper face of the top 3 are ground off to a very close and tight joint so that no gas can escape from between them. Surrounding the post and above the disk are washers 11 between which is an expansible rubber plug 12, and above the uppermost washer is a nut 13 and a jam nut 14, all these devices coöperating to hold the disk closely down upon the top and yet to permit it to rotate relatively thereto. For the purpose of turning it a handle 15 is provided, which may be constructed as shown or in any preferred design.

The outlet 4 is disposed to one side of the post 7 which stands at the center of the top, and the disk is pierced with a series of holes 27 each accurately measured as will appear from the description of the operation below.

The parts of this device are preferably entirely of metal excepting the rubber plug 12, and it can be conveniently carried in the pocket or in a hand bag. If there be a gage it may be well to detach it from the nipple 5, and then the two parts of the device can be easily carried in the pocket or in a hand bag.

The use of this tester is as follows: The house pipe having been detached from the meter, the threaded opening O is engaged therewith in its place, and the gas, air, or fluid turned on. The gage is connected with the nipple 5 and it will register the pressure in a manner which will be clear. The edge of the top 3 will be inscribed with a suitable mark 40, and when the handle lies over this mark no gas can escape from within the casing provided the nipple is closed. To test the workings of the meter and to ascertain if its dials properly register the number of cubic feet of gas passing through it, the handle 15 is turned so that the disk 10 is moved upon the top 3 until the first hole in the disk is brought opposite the outlet 4, according to the kind of gas, air or fluid being used, the pressure, the temperature, and other conditions being known to the workman; and in a hundred seconds (which is the customary time for testing gas meters) the user notes what has been registered on the dials of the meter. By reference to a table which he will carry, he can thus accurately determine the percentage of error and ascertain whether the meter is registering too much or too little; after which the tester is removed and the house pipe reattached to the meter if no error is found therein, or another meter may be substituted if there is a sufficient error to make it worth while. With correct conditions, when only one hole 27 is brought into register with the outlet 4 one cubic foot of gas should escape in a hundred seconds, and if the dials of the meter show that one cubic foot has escaped in ninety-eight seconds the meter will be 2% fast, and vice versa. Under other conditions or when this device is applied to water or other fluids, it may be necessary for the user to turn the disk until two holes register with the opening 4, or possibly eight holes; but the table to which he refers will have the calculation already made so that whatever the conditions, the number of holes, and the gas, liquid, or fluid which is being tested, his table will give the correct figure for a hundred seconds and anything below or above that figure registered by the meter shows an error in the latter.

I am aware that meter testers have been employed hitherto having an opening of accurately measured size and adapted to permit the passage of a certain volume of gas, air, or fluid during a hundred seconds, but it will be clear that the amount of gas, air, or fluid which may pass through such an opening will vary from time to time as the pressure or temperature changes, and it becomes desirable to have more than one orifice in the tester to meet these varying conditions. Also it is well known that different kinds of gas, air, or liquid at various pressures and temperatures flow at variable speeds, and hence where the orifice is not susceptible of change the workman is compelled to carry several testing devices. My present invention overcomes this difficulty by providing a single testing device having several orifices, more or less of which may be brought into register with the outlet 4 from the casing in a manner above explained.

What is claimed as new is:

1. The herein described meter tester comprising a casing whose bottom has a threaded opening adapted for attachment to the meter and whose top is pierced with an elongated outlet, a plate movably mounted on said top and pierced with a number of openings adapted to be brought successively over said outlet, a nipple projecting from the casing, and a gage removably attached to said nipple.

2. In a meter tester, the combination with a substantially cylindrical casing having an inlet opening through its base and a nipple through one side, a gage detachably connected with said nipple, and a plate closing the top of said casing and having an elongated curved outlet off its center; of a disk concentrically mounted upon said plate for rotation thereon and provided with a series of openings adapted to be brought successively into register with said outlet, and means for setting said disk.

3. The herein described meter tester comprising a casing whose bottom has an opening adapted for attachment to the meter and whose top is ground flat and provided with an elongated outlet off its center, a post rising through the center of said top and sealed thereto, a disk having its lower face ground flat and centrally journaled on the post with said face resting on the upper face of the top, the disk being pierced with a series of apertures adapted to be brought successively in register with said outlet, a handle on the disk, and means for bearing the latter downward on the top with spring force.

4. The herein described meter tester comprising a casing whose bottom has an opening adapted for attachment to the meter and whose top is ground flat and provided with an outlet off its center, a post rising through the center of said top and sealed thereto, a disk having its lower face ground flat and journaled on the post with said face resting on the upper face of the top, the disk being pierced with a series of apertures adapted to be brought successively in register with said outlet, a handle on the disk, two washers surrounding said post above the disk, an expansible rubber plug between them, and a nut and jam nut on the post above the washers.

In testimony whereof I have hereunto set my hand in presence of two subscribing witnesses.

ROY E. JOYCE.

Witnesses:
STEPHEN J. OSBORN,
JOHN H. KIETH.

---

Copies of this patent may be obtained for five cents each, by addressing the "Commissioner of Patents, Washington, D. C."